US006980799B2

(12) United States Patent
Akhteruzzaman et al.

(10) Patent No.: US 6,980,799 B2
(45) Date of Patent: Dec. 27, 2005

(54) METHOD FOR PRESERVING CALLS WHEN SERVICE IS INTERRUPTED TO A MOBILE UNIT IN A WIRELESS COMMUNICATION SYSTEM

(75) Inventors: Akhtar Akhteruzzaman, Naperville, IL (US); Paul Raymond Sand, Woodridge, IL (US); Richard Grant Sparber, Wheaton, IL (US); Claudis L. Young, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 456 days.

(21) Appl. No.: 10/177,157

(22) Filed: Jun. 21, 2002

(65) Prior Publication Data

US 2004/0203424 A1 Oct. 14, 2004

(51) Int. Cl.[7] .................................................. H04M 3/42
(52) U.S. Cl. .................... 455/414.1; 455/413; 455/416
(58) Field of Search ............................ 455/414.1, 416, 455/417, 412.1, 412.2, 413, 518, 519; 379/201.01

(56) References Cited

U.S. PATENT DOCUMENTS

| | | | | |
|---|---|---|---|---|
| 2002/0090947 A1 * | 7/2002 | Brooks et al. | .............. | 455/436 |
| 2003/0134617 A1 * | 7/2003 | Duerk et al. | ................ | 455/412 |

* cited by examiner

*Primary Examiner*—Lee Nguyen
(74) *Attorney, Agent, or Firm*—Steven R. Santema

(57) ABSTRACT

A method of preserving or gracefully concluding wireless calls that are dropped when service is interrupted in a wireless communication system (100) (e.g., due to poor RF coverage). When a mobile unit (108) encounters a service interruption during a call, an announcement (208) is played inviting remaining participating unit(s) to hold. After a predetermined waiting time (210, 216), if service is not re-established to the mobile unit, the remaining unit(s) are invited (218) to leave a message (e.g., voice mail) for the mobile unit and connected (220) to a messaging system (126). After message(s) are concluded, the call is ended (226) or optionally, lo continued (206) if there is more than one remaining unit. If service is recovered before the waiting time expires, a service recovery announcement is provided (214) to the remaining unit(s) and the call continues (206).

9 Claims, 2 Drawing Sheets

START
202 ESTABLISH CALL BETWEEN MOBILE UNIT AND PARTICIPATING UNIT(S)
204 MOBILE UNIT INTERRUPTED ?
NO
CONTINUE NORMAL CALL PROCESSING
206
YES
208 PLAY ANNOUNCEMENT TO REMAINING UNIT(S)
210 START WAIT TIMER
212 SERVICE RECOVERED TO INTERRUPTED MOBILE UNIT ?
YES
214 UPDATE/INFORM REMAINING UNIT(S)
NO
216 WAIT TIMER EXPIRED ?
NO
YES
218 UPDATE/INFORM REMAINING UNIT(S)
220 CONNECT REMAINING UNIT(S) TO MESSAGE SYSTEM
222 >1 REMAINING UNIT ?
YES
224 CONTINUE CALL ?
NO
226 END CALL
END

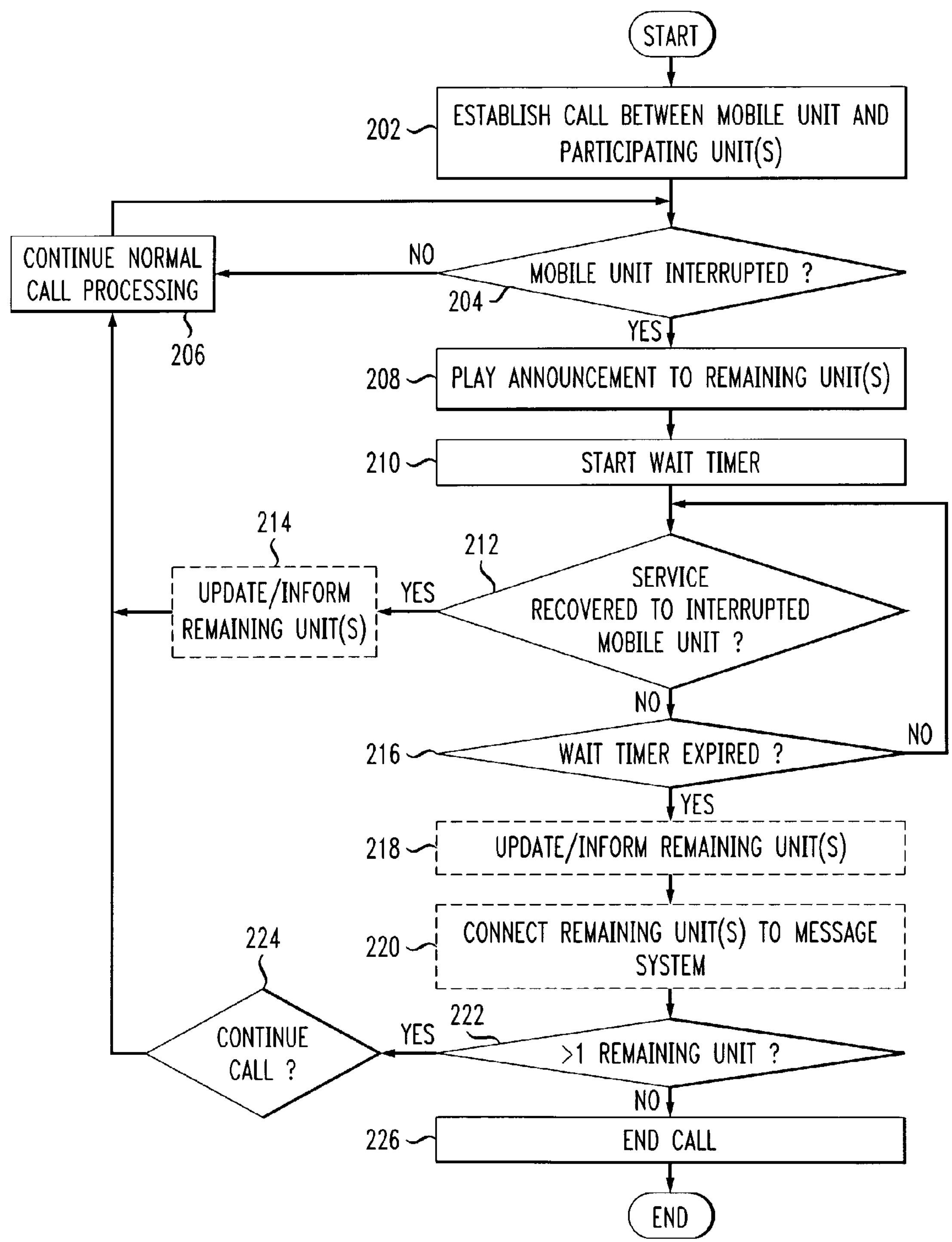
FIG. 2
START
202
ESTABLISH CALL BETWEEN MOBILE UNIT AND PARTICIPATING UNIT(S)
204
MOBILE UNIT INTERRUPTED ?
NO
CONTINUE NORMAL CALL PROCESSING
206
YES
208
PLAY ANNOUNCEMENT TO REMAINING UNIT(S)
210
START WAIT TIMER
212
SERVICE RECOVERED TO INTERRUPTED MOBILE UNIT ?
YES
214
UPDATE/INFORM REMAINING UNIT(S)
NO
216
WAIT TIMER EXPIRED ?
NO
YES
218
UPDATE/INFORM REMAINING UNIT(S)
220
CONNECT REMAINING UNIT(S) TO MESSAGE SYSTEM
222
>1 REMAINING UNIT ?
YES
224
CONTINUE CALL ?
NO
226
END CALL
END

METHOD FOR PRESERVING CALLS WHEN SERVICE IS INTERRUPTED TO A MOBILE UNIT IN A WIRELESS COMMUNICATION SYSTEM

FIELD OF THE INVENTION

This invention relates generally to wireless communication systems, and, more particularly, to a method for preserving or gracefully concluding calls when service is interrupted to mobile unit(s) in a wireless communication system.

BACKGROUND OF THE INVENTION

Wireless technology and services have grown exponentially over the past several years. As more and more people subscribe to wireless service, wireless service providers attempt to attract new subscribers and retain existing subscribers with unique features. Simultaneously, service providers generate revenue in proportion to subscribers' usage of the network and thereby desire to increase billable minutes on the network, both from individual subscribers and collectively from multiple subscribers.

A problem that arises is that mobile subscriber units can encounter periodic service interruption(s) during a call, for example, upon entering a tunnel or reaching a fringe RF coverage area, causing the mobile unit to become dropped (at least temporarily) from the call. In such case, other parties participating in the call (e.g., uninterrupted mobile units or wireline units) may terminate or "hang up" the call even though in some instances, service may be recovered to the mobile unit relatively quickly. Oftentimes, in such case, the parties do not re-attempt the call and, even if they do, one or more of the parties may be unavailable on the next attempt. Consequently, the conversation may never be completed. This represents both a source of frustration for subscribers and a lost opportunity cost for the service provider in terms of the additional minutes that might have been billed.

Accordingly, there is a need for a method for preserving calls when service is interrupted to a mobile unit. Advantageously, the method will increase customer satisfaction while simultaneously increasing the number of billable minutes on the network.

SUMMARY OF THE INVENTION

This need is answered and a technical advance is achieved in the art by a feature for wireless service providers to preserve calls for service outages that are relatively short in duration and, if service cannot be recovered in short order, to allow for a more graceful conclusion to the call. When a mobile unit encounters a service interruption during a call, the service provider directs the remaining units to hold. If service is recovered to the mobile unit within a designated waiting time, the service provider informs the remaining units of the recovery and the call may continue. Otherwise, if the waiting time expires before service is recovered to the mobile unit, the remaining units are connected to a messaging system and invited to leave a message (e.g., voice mail) for the interrupted mobile unit.

BRIEF DESCRIPTION OF THE DRAWINGS

The foregoing and other advantages of the invention will become apparent upon reading the following detailed description and upon reference to the drawings in which:

FIG. 2 is a flowchart showing a method for use in conjunction with a communication system of the type shown in FIG. 1, for processing the call when service is interrupted to the mobile unit.

DESCRIPTION OF THE PREFERRED EMBODIMENT(S)

Figure 1:
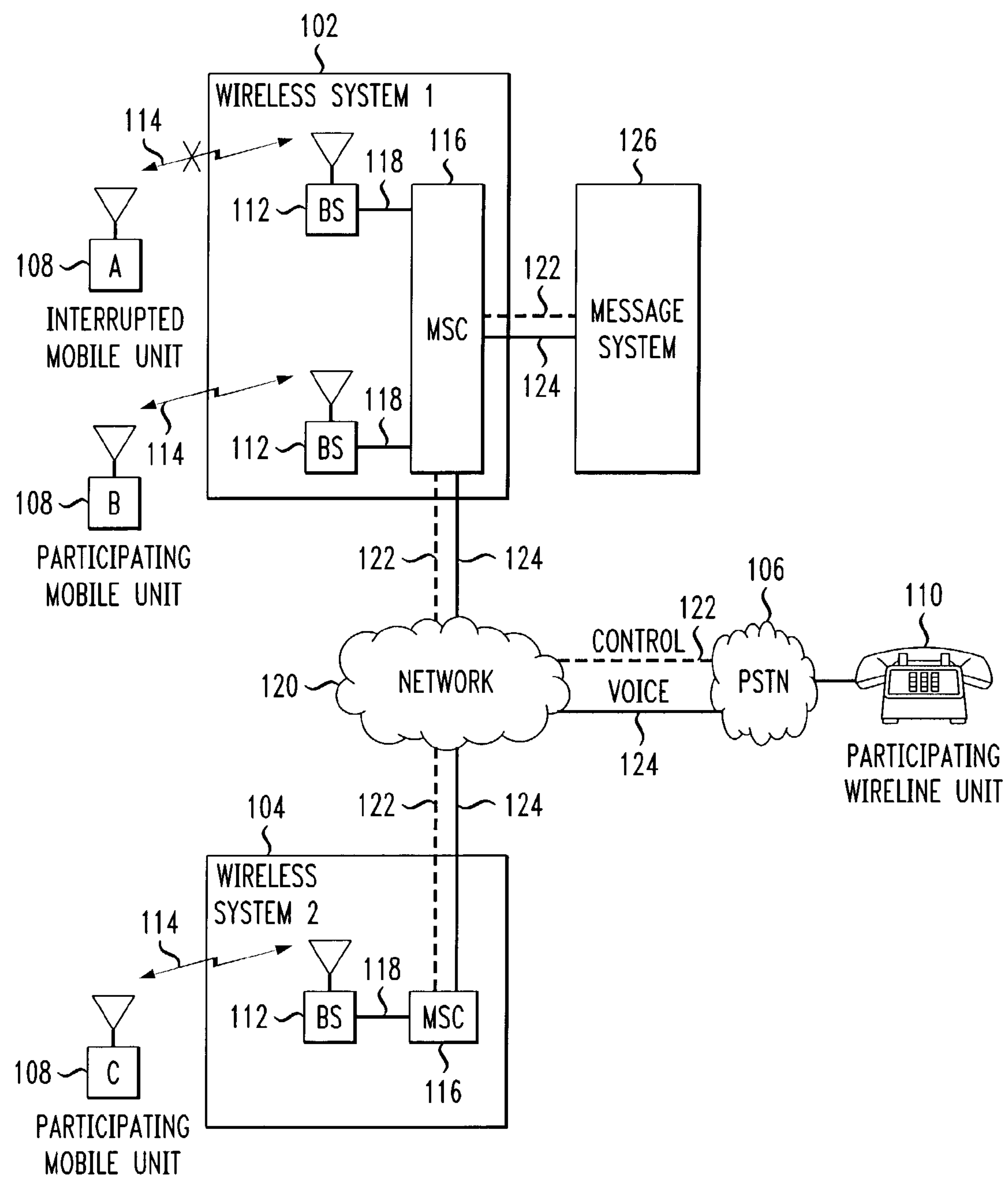
FIG. 1 is a block diagram of a communication system according to an exemplary embodiment of the present invention, illustrating an interruption of service to a wireless mobile unit.

FIG. 1 shows by way of example and not limitation, a wireless communication system 100 comprising a plurality of wireless subsystems 102, 104 ("Wireless System 1" and "Wireless System 2") interconnected to each other and to the public switched telephone network (PSTN) 106 by a network 120. The wireless subsystems 102, 104 may comprise public or private systems, or a combination thereof. As will be appreciated, although the wireless subsystems 102, 104 are shown as separate subsystems, these systems may, in fact, be integrated into a single wireless system connected, via network 120, to the PSTN 106. The network 120 may be implemented using any appropriate transmission, switching and routing technologies, as are known in the art, including but not limited to Internet Protocol (IP) and Asynchronous Transfer Mode (ATM) technologies.

Distributed among the wireless subsystems 102, 104 is a plurality of mobile units 108 (denoted "A," "B" and "C") and attached to the PSTN is a wireline unit 110 (denoted "D"). The mobile units 108 comprise wireless devices that may include, but are not limited to, cell phones, two-way radios, laptop computers, personal digital assistants (PDAs) and the like having varying capacities to transmit information, such as voice, video, text or data traffic ("payload information") or control signaling ("control information") associated with communication service(s). The wireline unit 110 comprises generally any telephony device attached to the PSTN that is operable to exchange payload or control information associated with selected service(s) with the mobile units or with other wireline devices. The communication services may comprise, for example, wireless telephone service, electronic mail, facsimile service, paging service, short message service, electronic commerce, location service and/or packet data service.

The mobile units 108, generally, are adapted to roam between different RF coverage areas, sometimes referred to as "cells" (not shown) served by base stations 112. Each subsystem 102, 104 may include multiple base stations 112 serving multiple cells. The mobile units 108 communicate with the base stations 112 via RF resources 114 which may comprise narrowband frequency modulated channels, wideband modulated signals, broadband modulated signals, time division modulated slots, carrier frequencies, frequency pairs or generally any medium for communicating control or payload information to and from the mobile units.

Wireless calls between and among the mobile units 108 and/or wireline units 110 are controlled by one or more telecommunication switching systems, exchanges or the equivalent, hereinafter termed mobile switching centers (MSCs) 116. The MSC(s) 116 may comprise, for example, 5ESS® switching systems, available from Lucent Technologies, Inc. As shown, separate MSCs 116 are contained within each of the subsystems 102, 104. As will be appreciated, however, a single MSC may control both subsystems (or a single, integrated system). The MSCs 116 include respective memory and processors (not shown), for storing and executing software routines for processing and switching calls, for providing various call features to calling parties and for providing access to the network 120 and PSTN 106. The MSCs 116 may be configured for operation with generally any suitable circuit, cell, or packet switching technology.

The MSCs 116 are connected to the base stations 112 by links 118, which may comprise, without limitation, conventional subscriber lines, ISDN lines, Ethernet LAN, wireless links, and the like. Links 122, 124 carry control and payload information, respectively, via network 120, between different MSCs 116, between MSC(s) and the PSTN 106 and, as shown, between the MSC of Wireless System 1 and a messaging system 126, such as a voice mail system. As shown, the payload information comprises voice information. Alternatively or additionally, the payload information may comprise information associated with video, data, text or generally any communication media. The messaging system is not limited to a voice mail system but rather may comprise generally any appropriate system for wireless or wireline units to leave messages with other wireless or wireline units. The links 122, 124 are logical links that may be physically realized, without limitation, by conventional subscriber lines, ISDN lines, WAN links, wireless links, and the like.

In the exemplary embodiment of FIG. 1, it is presumed that the MSC(s) 116 had established a call between mobile unit A and one or more participating units B, C and D and, sometime during the call, service became interrupted to mobile unit A. (Hence, the "X" drawn through the RF channel 114 serving mobile unit A.) This might occur, for example, upon mobile unit A entering a tunnel or reaching a fringe RF coverage area. In the preferred embodiment, the present invention provides a method for preserving the call, at least temporarily for the remaining one or more participating units B, C and D, to allow time for service to be recovered to mobile unit A. If service is not recovered within a reasonable time, the present invention provides for gracefully concluding the call by inviting the participating units to leave a message for mobile unit A. This is best observed with reference to FIG. 2.

Turning now to FIG. 2, there is shown a flowchart showing a method for use in conjunction with a communication system of the type shown in FIG. 1, for processing the call when service is interrupted to a mobile unit. The steps of FIG. 2 are implemented, where applicable, using stored software routines within one or more of the MSCs 116.

At step 202, a call is established between a mobile unit and one or more participating units, which participating units may comprise other mobile units or wireline units. For example, with reference to FIG. 1, a call is established between mobile unit A and some combination of mobile units B, C and wireline unit D. Generally, the step of establishing a call presumes each mobile unit has registered and acquired an RF channel within a cell/sector of the communication system in which it is presently located. Registration typically occurs upon power up of the mobile unit(s) and, where applicable, upon roaming and "handoff" of the mobile unit(s) to new cells/sectors. As will be appreciated, methods for performing mobile unit registration are well known in the art and do not form a part of the present invention.

At step 204, a determination is made whether service has been interrupted to a mobile unit. Typically, a base station of the cell/sector in which the mobile unit is registered makes such determination, initially, and reports the incident to the MSC. For example, in the case where a mobile unit (e.g., mobile unit A) enters a poor coverage area, the base station of the cell/sector in which the mobile unit is registered detects that RF signals from the mobile unit are below an acceptable threshold and reports the incident to the MSC. Generally, unless the MSC knows that the mobile unit has roamed to and registered with a new cell/sector, the MSC will determine from the report of weak signals that service has been interrupted to the mobile unit.

Until such determination is made, call processing continues normally at step 206. If service interruption is determined to have occurred, the MSC plays at step 208 (or causes to have played) an announcement informing the remaining units that service has been interrupted to the mobile unit and inviting them to hold. Thus, continuing the present example, if unit A enters a poor RF coverage area while engaged in a call with some combination of units B, C and D, an announcement may be played to units B, C, D to the effect of:

"Please hold. The party you are talking with is temporarily in a poor coverage area. You will be reconnected in a few moments."

As will be appreciated, the announcement may be varied as needed or desired by the service provider to accommodate different type(s) of service outages, languages and so forth, and may be realized in different media (e.g., voice, video or text) depending on the capabilities of the participating units. It is presumed for purposes of example that, responsive to the announcement at step 208, at least one participating unit will hold to await service recovery and reconnection to the mobile unit.

At step 210, the MSC starts a wait timer to measure the amount of time the remaining participating units are on hold which, in the preferred embodiment, is not allowed to exceed a relatively short time limit allowing for relatively rapid service recovery to the mobile unit. The hold time may be predetermined or dynamically determined and may be varied for different types of service outages. For example, a hold time on the order of ten seconds could be used to allow time for a mobile unit having entered a tunnel to emerge from the tunnel and re-establish RF service. Those skilled in the art will appreciate that a number of alternative timing schemes may be used to implement the wait timer including, without limitation, count-up timers, count-down timers or absolute times.

At step 212, if the waiting time is not expired, a determination is made whether service has been recovered to the mobile unit. Typically, a base station makes such determination, initially, upon detecting re-registration of the mobile unit, and the base station reports such re-registration to the MSC. Thus, in the example where mobile unit A entered a poor coverage area, the base station of the cell/sector in which mobile unit A was formerly registered may detect re-registration of mobile unit A (or, if mobile unit A has roamed to a new coverage area, a base station of the new coverage area may detect registration) and reports the incident to the MSC.

If service recovery is determined to have occurred, the MSC optionally at step 208 updates/informs the holding units by voice, video or text announcement that service has been recovered to the mobile unit and the call is continued at step 206. Otherwise, if service recovery is not detected before the wait timer has expired (determined at step 216), the MSC optionally at step 218 updates/informs the holding units that service has not been recovered to the mobile unit and invites them to leave a message. At step 220, the MSC connects the holding units to an associated messaging system (e.g., a voice mail system). For example, the MSC may play (or cause to be played) an announcement to the effect of:

"The other party apparently temporarily can not reach a better coverage area. Please leave a message for the other party."

As will be appreciated, the announcement may be varied as needed or desired by the service provider to accommodate different type(s) of service outages, languages and so forth, and may be realized in different media (e.g., voice, video or text) depending on the capabilities of the participating units. Moreover, the invention may be realized with virtually any type of messaging system presently known or devised in the future.

Responsive to the announcement at step 220, it is presumed that one or more participating units will leave a message for the mobile unit via the messaging system. Typically, when the message is concluded, the messaging system will send a message to the MSC indicating that the message is concluded. In one embodiment, upon receiving such message, the MSC determines at step 222 whether there are more than one remaining units and, at step 224, whether the call should be continued. That is, in some instances, if there are multiple remaining units, the remaining units may desire to continue the call without the interrupted mobile unit. Optionally, the decision at step 224 is made in response to polling the remaining users or prompting for a particular keypad entry. For example, the remaining users may be prompted to press the "*" key to continue. In such case, the users are removed from hold status and the call continues at step 206. Otherwise, if there is only one remaining unit, or if the remaining units do not desire to continue the call, the call is ended at step 226.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a wireless communication system wherein a call is established between a mobile unit and one or more participating units, and wherein the mobile unit is subject to periodic service interruption during the call, a method of preserving the call during the service interruption, the method comprising:

detecting a service interruption to the mobile unit;

responsive to detecting the service interruption, inviting the participating units to hold to await for recovery of service to the mobile unit, thereby yielding one or more holding units of the participating units;

determining a hold time;

substantially upon expiration of the hold time, connecting one or more holding units to a messaging system; and inviting the holding units to leave a message for the mobile unit;

receiving, from the messaging system, indicia that a message for the mobile unit is concluded;

identifying a number of remaining units of the holding units; and if the number of remaining units is two or more, removing the two or more remaining units from hold status; and continuing the call between the remaining units.

2. In a wireless communication system wherein a service interruption is encountered by a mobile unit while engaged in a call with two or more participating units, and the two or more participating units are invited to hold to await for service recovery to the mobile unit, a method comprising:

removing the two or more participating units from hold status; and continuing the call between the participating units without the mobile unit.

3. The method of claim 2 wherein the step of continuing the call between the participating units is performed responsive to polling the participating units to determine that they desire to continue the call.

4. The method of claim 2 wherein the step of continuing the call between the participating units is performed responsive to receiving a keypad entry from the participating units indicating their desire to continue the call.

5. The method of claim 2 wherein the step of continuing the call between the participating units is performed responsive to prompting the participating units for a keypad entry indicating their desire to continue the call and receiving said keypad entry from the participating units.

6. In a wireless communication system wherein a service interruption is encountered by a mobile unit while engaged in a call with two or more participating units, and the two or more participating units are placed to hold to await for service recovery to the mobile unit, a method comprising:

connecting the participating units to a messaging system;

inviting the participating units to leave a message for the mobile unit;

receiving, from the messaging system, indicia that a message for the mobile unit is concluded;

when the message for the mobile unit is concluded, removing the two or more participating units from hold status and continuing the call between the participating units.

7. The method of claim 6 wherein the step of removing the participating units from hold status and continuing the call is performed responsive to polling the participating units to determine that they desire to continue the call.

8. The method of claim 6 wherein the step of removing the participating units from hold status and continuing the call is performed responsive to receiving a keypad entry from the participating units indicating their desire to continue the call.

9. The method of claim 6 wherein the step of removing the participating units from hold status and continuing the call is performed responsive to prompting the participating units for a keypad entry indicating their desire to continue the call and receiving said keypad entry from the participating units.

* * * * *